Patented Apr. 21, 1925.

1,534,729

UNITED STATES PATENT OFFICE.

ALBERT OBERSOHN, OF BERLIN-CHARLOTTENBURG, WILHELM WACHTEL, OF BERLIN, DANIEL SAKOM, OF WIESBADEN, AND PAUL ASKENASY, OF KARLSRUHE, GERMANY.

PROCESS FOR THE MANUFACTURE OF COLLOIDAL SUBSTANCES IN THE FORM OF SMALL BALLS OR GRAINS.

No Drawing. Application filed March 13, 1924. Serial No. 699,127.

*To all whom it may concern:*

Be it known that I, ALBERT OBERSOHN, a citizen of Hungary, residing at 53 Pestalozzistrasse, Berlin-Charlottenburg, Germany, and I, WILHELM WACHTEL, a citizen of Austria, residing at 61 Bambergerstrasse, Berlin, Germany, and I, DANIEL SAKOM, a citizen of Lithuania, residing at 13 Adolfsallee, Wiesbaden, Germany, and I, PAUL ASKENASY, a citizen of Germany, residing at 44 Kaiserallee, Karlsruhe, Baden, Germany, have jointly invented new and useful Improvements in Processes for the Manufacture of Colloidal Substances in the Form of Small Balls or Grains, of which the following is a specification.

When a hot solution of a colloidal substance, such as glue, gelatine or the like, is passed through a cooling bath composed of a liquid which does not mix with the colloid, the resulting drops of the colloid form into small balls or grains which are rapidly solidified by the action of the cooling bath. The grains so produced may then be removed and dried. Glue in this form is very convenient both for use and for shipment and it dries more easily than in slab form and is more readily melted. In the following specification, the terms glue or solutions of glue are to be understood to include all colloidal substances having the properties of glue which it is or may be considered desirable to produce in granular form.

Benzol, tri-chloro-ethylene and tetrachloro-ethane together with mixtures of these substances have proved well suited as cooling baths owing to the fact that their action is conducive to the production of regular pellets or grains. The colloidal solution may be introduced into a cooling bath made up of such substances in any desired manner as for instance in the form of a continuous stream.

A disadvantage arises from the fact that the cooling liquid or fluid adheres to the grains, thereby causing loss of valuable material and impurity of the finished product. It has been tried to remove this evil by straining or by centrifugal means but without adequate success as the basket of the centrifugal or the like apparatus employed very soon become filled with inflammable, poisonous or noisome vapours.

These disadvantages may be avoided in two ways, either by employing a cooling agent which does not produce the undesirable phenomena mentioned or by passing the grains through a bath directly after they leave the solidifying bath, so as to remove the cooling agent adhering to the grains.

It has been demonstrated that it is possible to employ for the purposes of this invention, fluids which do not so favourably assist the action of the formation of the grains, as for instance aqueous solution of salts, aqueous emulsions and the like, provided the colloidal substance is introduced to the fluid in question in the form of drops. Such fluids have the merit that they are cheaper and do not have any deleterious action even if they do adhere to some extent to the grains.

According to the present invention the cooling agent may also be a gas. In this case the difficulty of complete separation of the solidified material and the cooling agent is avoided.

When using a gas as cooling agent there are no losses as the solidification in the form of balls or drops proceeds without any loss of the cooling agent or impurification of the glue, that is to say there is complete separation of the two substances.

This form of the process is especially cheap and the cooling agent may be kept cool in a simple manner, moreover, the apparatus is simple.

It is advisable in the case of a gaseous cooling agent to pass a shower of drops of the glue or the like in a counter stream to a current of the gas. In some cases it is also possible to pump or spray the colloid under pressure into a container in which the gas is held under pressure. By this means the velocity of the fall of the drops is retarded and the height of the fall within the container may be reduced and the depth of the gas holder correspondingly reduced.

Water, aqueous solutions or emulsions may be used as the cleansing agent with a cooling fluid which does not mix with the colloid, so long as such the cleansing agent readily parts with the residue of the cooling agent adhering to the grains.

A further feature of the invention consists in passing the grains of glue to a cleansing bath directly after the cooling operation, the fluid of the cleansing bath being non-miscible with the fluid of the cooling bath.

Some of the cooling agents which have been found suitable, such as benzol, are lighter than water. This facilitates the operation of cleansing, as the solidifying and cleansing processes can follow one another directly as a single uninterrupted operation. According to the invention, a layer of the cooling fluid, e. g. benzol, is superposed on a layer of the cleansing agent, e. g. water, in a single receptacle so that the glue passes directly from the cooling agent to the cleansing bath, to the bottom of which it falls and from which it is removed in a cleansed state.

In carrying the invention into effect, a cylindrical container 5 metres high and 1 metre diameter may be filled to a height of 1 metre with water and on top of this benzol may be filled to a height of 3 metres. Suitable cooling jackets or other well known means may be employed to retain these fluids at a temperature of about 1 degree centigrade. A glue solution at a temperature of about 50 degrees centigrade straight from the glue separating plant, is fed in the form of drops into the benzol. These drops solidify into their passage through the benzol and reach the water in a more or less firm plastic state. They then fall or sink rather more slowly through the water and settle as solid grains at the bottom of the container from which they may be removed for drying in any suitable manner.

It frequently occurs that it is necessary to use a cooling fluid which is heavier than water, as for instance tetra-chloro-ethane. In order to effect cleansing in such cases, the grains are taken from the heavy cooling bath and passed into a second bath containing a lighter cooling agent, such as benzol, superposed on a layer of water somewhat as described above, whereby the cleaning may be effected without difficulty.

A still simpler way to attain the same end, however, is to add suitable soluble agents to the cleansing fluid so as to increase its specific gravity to a point higher than the specific gravity of the cooling agent.

If water is used as the cleansing agent, the desired end is attained in the simplest manner by dissolving a suitable quantity of common salt in the water. The cooling liquid in this case rests on the top of the salt solution and the processes of cooling and cleansing proceed uninterruptedly as before described.

It is evident that the cooling may be effected by superposed stratified layers of liquids and gases, which may in turn be superposed on one or more layers of a suitable cleansing agent.

What we claim is:

1. A process for reducing a colloidal substance to granular form comprising forming said substance into drops, fixing the form of said drops by preliminary chilling, and solidifying the granules thus formed by passage through an agent physically reactive with said substance.

2. A process for reducing a colloidal substance to granular form comprising forming said substance into drops, fixing the form of said drops by preliminary chilling, in a fluid non-reactive with said substance, and solidifying the granules thus formed by passage through an agent physically reactive with said substance.

3. A process for reducing a water-soluble colloidal substance to granular form comprising forming said substance into drops, fixing the form of said drops by chilling in cold tetrachloroethane, and solidifying the granules thus formed by passage through a cold aqueous solution.

4. A process for reducing a hot water-soluble liquid colloidal substance to granular form comprising forming said substance into drops, fixing the form of said drops by chilling in cold tetrachloroethane, and thereafter solidifying and cleansing the granules thus formed by passage through a cold aqueous solution.

5. A process of producing colloidal substances in the form of small balls or grains by passing a solution of the colloid through a cooling agent, consisting in forming said colloid into drops and presenting said drops to a cooling fluid physically reactive to said colloid.

6. A process of producing colloidal substances in the form of small balls or grains by passing a solution of the colloid through a cooling agent, consisting in forming said colloid into drops and presenting said drops to a cooling fluid physically reactive to said colloid, and moving in counter-current to said drops.

7. A process for producing colloidal substances in granular form consisting in passing the colloid in the form of a solution split up into drops into a cooling agent substantially non-miscible therewith, and then passing the colloid granules so formed into a cleansing agent which is non-miscible in said cooling agent.

8. A process for producing colloidal substances in granular form consisting in passing the colloid in the form of a solution split up into drops into cold tetrachloroethane and then allowing the colloid granules so formed to pass into an aqueous cooling solution.

9. A process of preparing solid colloidal granules consisting in passing hot liquid drops of the colloid into a cooling agent substantially non-miscible therewith and permitting the drops to fall by gravity therethrough and into an aqueous cleansing solution non-miscible with said cooling agent.

10. In the process as set forth in claim 2, the step which comprises artificially increasing the specific gravity of said aqueous solution to above the specific gravity of said tetrachloroethane, by the addition to said aqueous solution of substances soluble in water, but insoluble in tetrachloroethane and having no chemical reaction upon said granules.

In testimony whereof we have signed our names to this specification.

ALBERT OBERSOHN.
WILHELM WACHTEL.
DR. DANIEL SAKOM.
DR. PAUL ASKENASY.